Feb. 12, 1924. Re. 15,759

J. E. GLEASON ET AL

METHOD OF AND MACHINE FOR CUTTING GEARS OR WHEELS

Original Filed Dec. 26, 1914 9 Sheets-Sheet 1

Inventors
James E. Gleason
Arthur L. Stewart

By Harold E. Stonebraker,
their Attorney

Feb. 12, 1924. Re. 15,759

J. E. GLEASON ET AL

METHOD OF AND MACHINE FOR CUTTING GEARS OR WHEELS

Original Filed Dec. 26, 1914 9 Sheets-Sheet 2

Inventors
James E. Gleason
Arthur L. Stewart
By Harold R. Stonebraker
their Attorney Feb. 12, 1924.

J. E. GLEASON ET AL

Re. 15,759

METHOD OF AND MACHINE FOR CUTTING GEARS OR WHEELS

Original Filed Dec. 26, 1914 9 Sheets-Sheet 3

Inventors
James E. Gleason
Arthur L. Stewart
By Harold E. Stonebraker,
their Attorney Feb. 12, 1924. Re. 15,759
J. E. GLEASON ET AL
METHOD OF AND MACHINE FOR CUTTING GEARS OR WHEELS
Original Filed Dec. 26, 1914 9 Sheets-Sheet 4
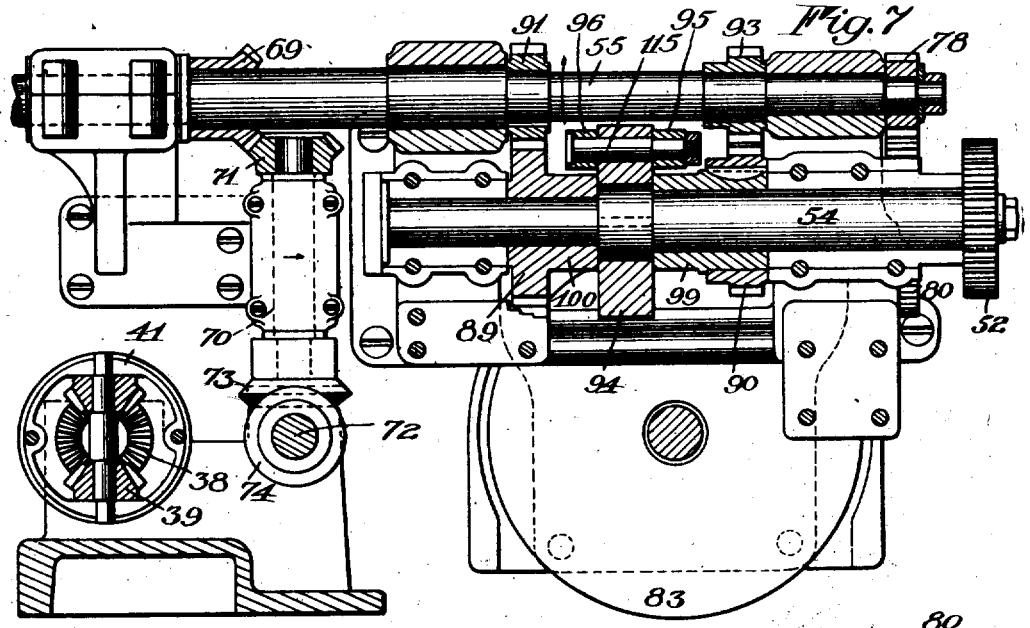
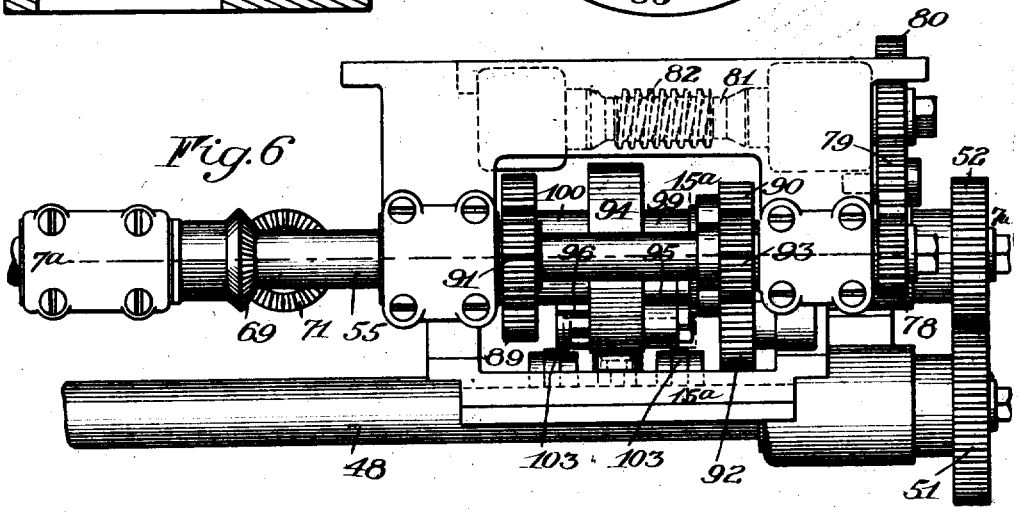
Inventors
James F. Gleason
Arthur L. Stewart
By Harold R. Stonebraker,
their Attorney Feb. 12, 1924.

J. E. GLEASON ET AL

Re. 15,759

METHOD OF AND MACHINE FOR CUTTING GEARS OR WHEELS

Original Filed Dec. 26, 1914 9 Sheets-Sheet 5

Inventors
James E. Gleason
Arthur L. Stewart
By Harold R. Stonebraker
their Attorney Feb. 12, 1924. Re. 15,759

J. E. GLEASON ET AL

METHOD OF AND MACHINE FOR CUTTING GEARS OR WHEELS

Original Filed Dec. 26, 1914 9 Sheets-Sheet 6

Inventors
James E. Gleason
Arthur L. Stewart
By Harold R. Stonebraker,
their Attorney Feb. 12, 1924.

J. E. GLEASON ET AL

Re. 15,759

METHOD OF AND MACHINE FOR CUTTING GEARS OR WHEELS

Original Filed Dec. 26, 1914 9 Sheets-Sheet 7

Inventors
James E. Gleason
Arthur L. Stewart
By Harold R. Stonebraker,
their Attorney Feb. 12, 1924.
J. E. GLEASON ET AL
Re. 15,759
METHOD OF AND MACHINE FOR CUTTING GEARS OR WHEELS
Original Filed Dec. 26, 1914 9 Sheets-Sheet 8
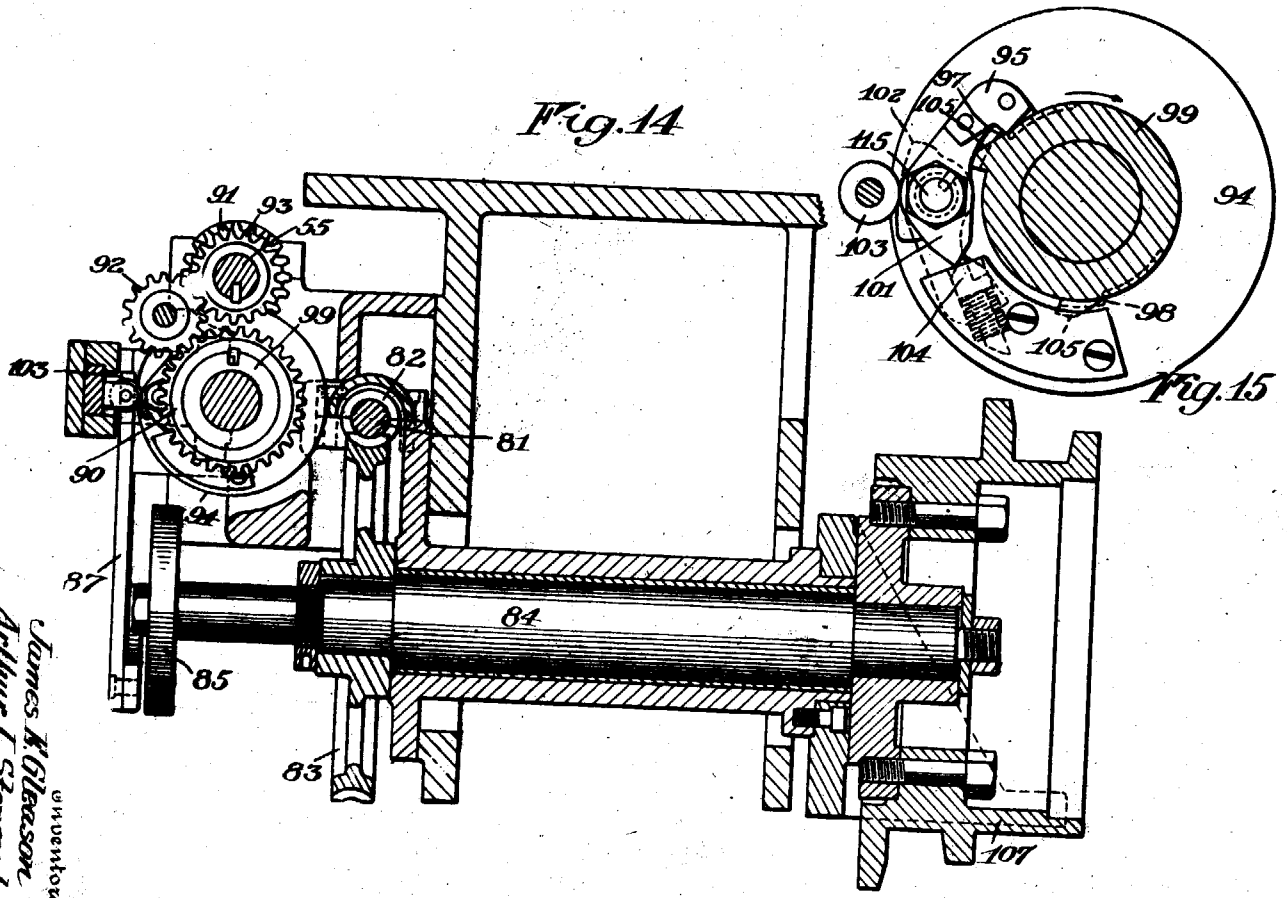
Inventors
James K. Gleason
Arthur L. Stewart
By Harold E. Stonebraker
their Attorney Feb. 12, 1924. Re. 15,759
J. E. GLEASON ET AL
METHOD OF AND MACHINE FOR CUTTING GEARS OR WHEELS
Original Filed Dec. 26, 1914 9 Sheets-Sheet 9
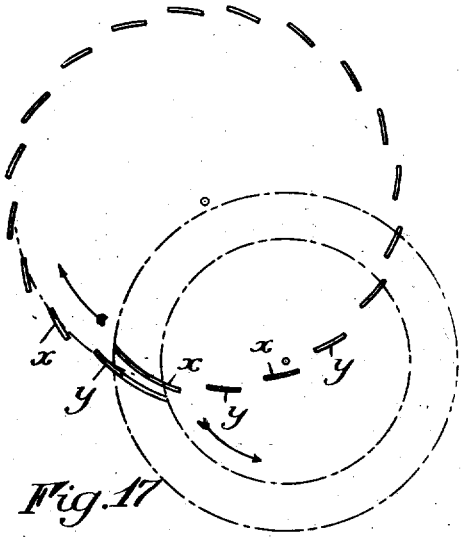
Fig. 17
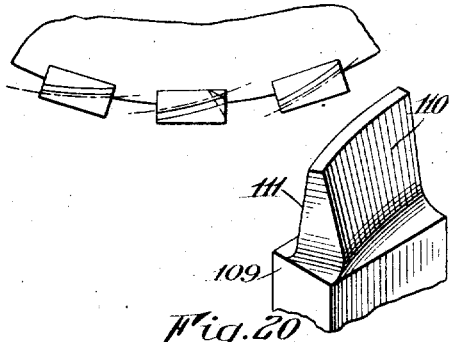
Fig. 19
Fig. 20
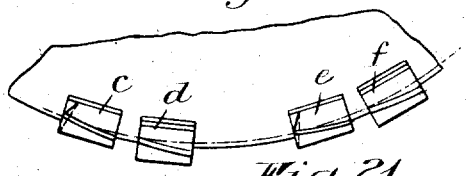
Fig. 21
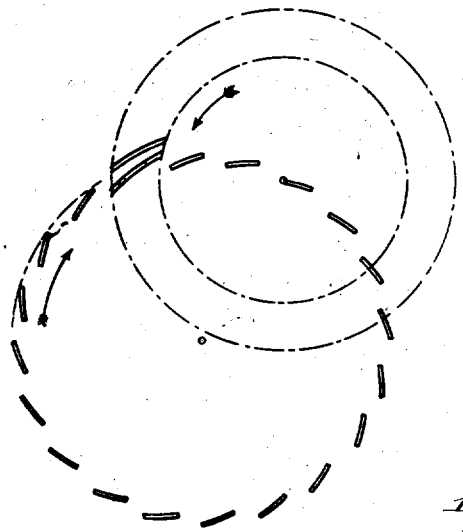
Fig. 18
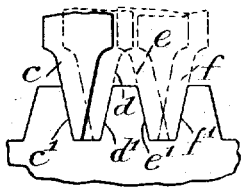
Fig. 22
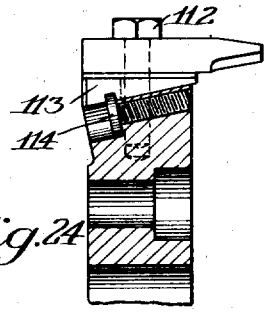
Fig. 24
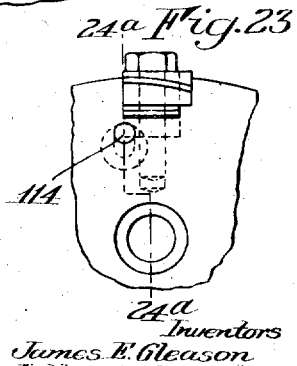
Fig. 23
Inventors
James E. Gleason
Arthur L. Stewart
By Harold E. Stonebraker
their Attorney Reissued Feb. 12, 1924. Re. 15,759

UNITED STATES PATENT OFFICE.

JAMES E. GLEASON AND ARTHUR L. STEWART, OF ROCHESTER, NEW YORK, ASSIGNORS TO GLEASON WORKS, OF ROCHESTER, NEW YORK, A CORPORATION OF NEW YORK.

METHOD OF AND MACHINE FOR CUTTING GEARS OR WHEELS.

Original No. 1,349,951, dated August 17, 1920, Serial No. 879,026, filed December 26, 1914. Application for reissue filed June 25, 1923. Serial No. 647,746.

*To all whom it may concern:*

Be it known that we, JAMES E. GLEASON and ARTHUR L. STEWART, both citizens of the United States of America, residing at Rochester, in the county of Monroe and State of New York, have invented certain new and useful Improvements in Methods of and Machines for Cutting Gears or Wheels; and we do hereby declare the following to be a full, clear, and exact description of the same, reference being had to the accompanying drawings, forming a part of this specification, and to the reference numerals marked thereon.

The invention pertains generally to a method of and machine for cutting teeth or blades on gears, wheels, or similar bodies, and among the various possible applications, it is designed more particularly with reference to the production of curved, generated teeth on bevel gears, the chief purpose being to afford an improved method and mechanism for producing theoretically correct curved gear teeth speedily and with accuracy. The method consists, broadly stated, in producing a bevel gear by rotating a cutter, in intermeshing relation with a continuously rotating bevel gear blank to shape the teeth and to index the blank, and simultaneously causing a relative rolling movement between the blank and cutter to generate the tooth in the manner of a crown gear in mesh with the gear to be cut.

To these and other ends the invention consists in certain improvements and combinations of parts all as will be hereinafter more fully described, the novel features being pointed out in the claims at the end of the the specification.

In the drawings:

Figure 6 is a plan view of the reversing mechanism shown generally in Fig. 1;

Figure 7 is a sectional view on the line $7^a$—$7^a$ of Fig. 6, with parts appearing in elevation;

Figure 14 is a sectional view on the line $14^a$—$14^a$ of Fig. 12, showing the gearing which controls the movement of the blank carrier table;

Figure 15 is a sectional view on the line $15^a$—$15^a$ of Fig. 6.

Figure 16 is a sectional view on the line $16^a$—$16^a$ of Fig. 1;

Figure 17 is a diagrammatic view showing the relative position of the tool head and blank, when cutting a bevel gear;

Figure 18 is a similar view illustrating the arrangement of tools and relative position of parts for cutting a bevel pinion;

Figure 19 is a partial elevation of a tool head showing the position of the cutting tools thereon;

Figure 20 is a perspective view, in part, of one of the tools;

Figure 21 is a plan view of a tool head, with a modified arrangement of tools, whereby a cut is made on both sides of each tooth during one complete revolution of the blank;

Figure 22 is a detail view showing the cutting relation of the tools to a blank, with the arrangement of tools shown in Fig. 21;

Figure 23 is a side elevation of a portion of the tool head, illustrating the arrangement of one of the tools;

Figure 24 is a sectional view on the line 24a—24a of Fig. 23, and

Similar reference characters in the several figures indicate the same parts.

Figure 1:
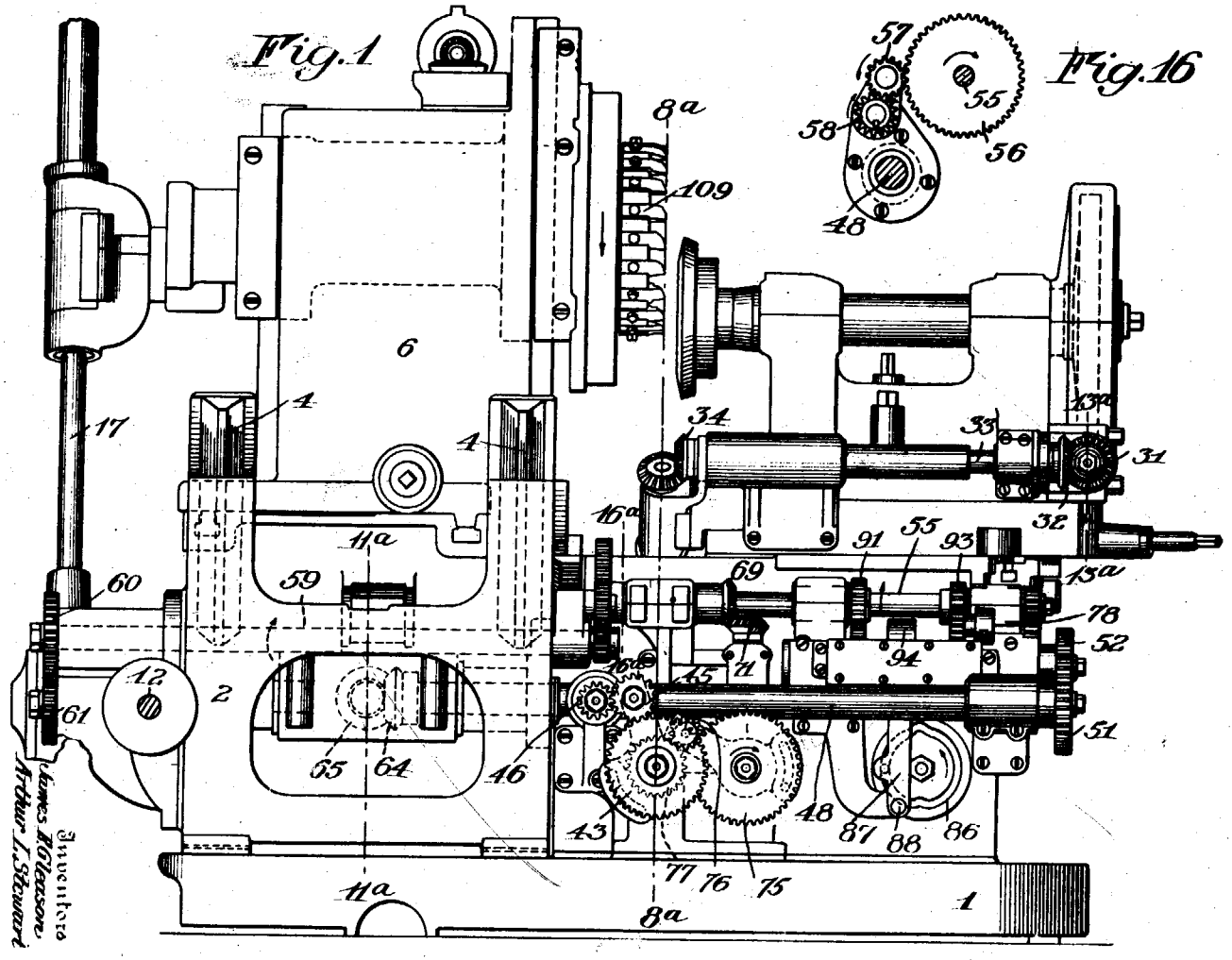
Figure 1 is a side elevation of a machine, illustrating the invention in one of its possible embodiments, the blank and tool head being out of cutting relation.
Figure 2:
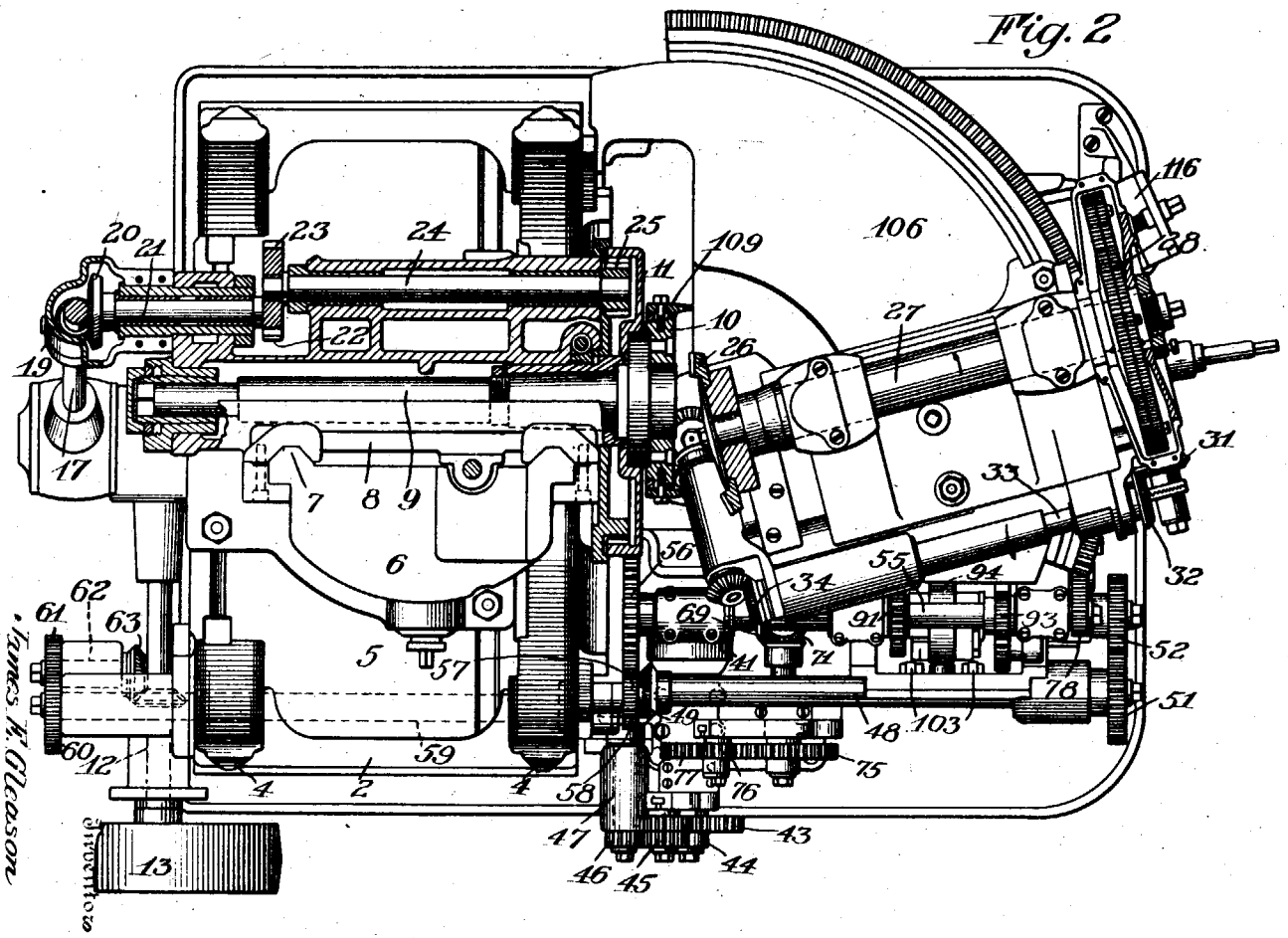
Figure 2 is a plan view with parts in section, the blank being partially fed in to the full cutting depth.
Figure 3:
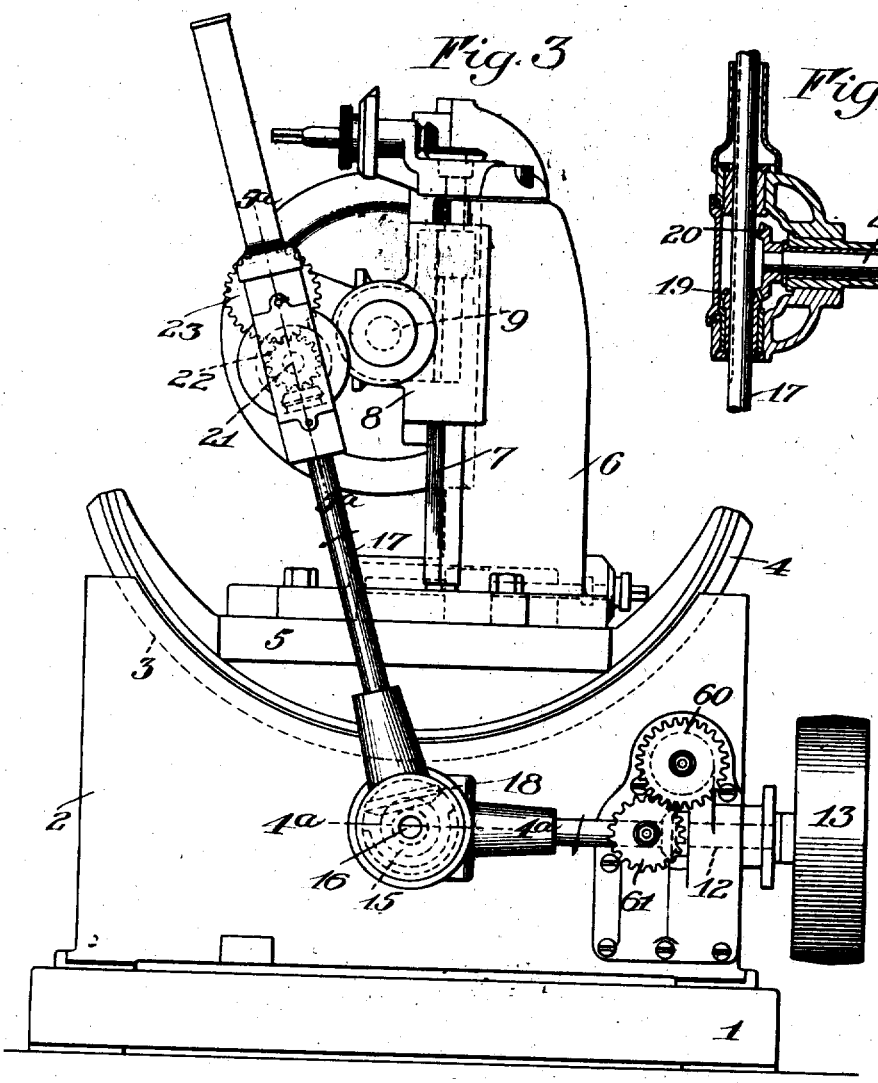
Figure 3 is an end elevation, looking toward the right of Fig. 1.
Figure 5:
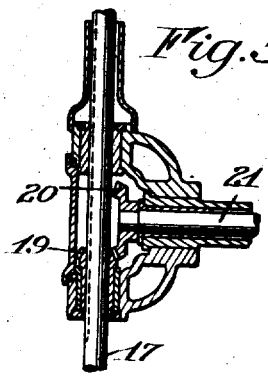
Figure 5 is a vertical sectional view on the line $5^a$—$5^a$ of Fig. 3.
Figure 4:
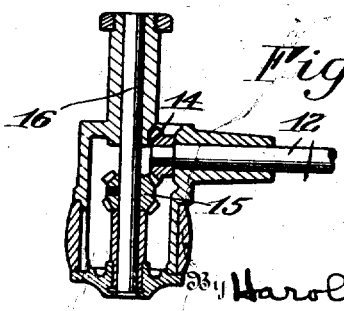
Figure 4 is a horizontal sectional view on the line $4^a$—$4^a$ of Fig. 3.

The embodiment of the invention herein shown and described is intended merely for the purposeof illustration, and while designed for producing what is known in the art as a curved gear tooth, it is to be understood that the invention is likewise adapted for producing curved cuts on wheels or similar bodies, to form blades, teeth or the like, and in the following description and claims the term "tooth" is employed as comprehending a blade or similar portion produced on the periphery or other face of a wheel by means of cuts or slots formed on opposite sides of the tooth. The term "cutting motion" refers to the forward movement of a tool, or its travel across the face of a blank, or lengthwise of the tooth being cut, this "cutting motion" being distinct from the "generating" or "rolling" motion. Where the terms "generating motion" or "rolling motion" are employed, they are used synonymously, and together with "generated tooth" refer to the elative movement between the blank and tool, corresponding to the movement of a gear rolling upon a rack, as exemplified in prior Patents No. 1,203,608, November 7, 1916, No. 1,310,761, July 22, 1919, and No. 1,325,784, December 23, 1919, and resulting in the formation, or generation, as it is called, of a theoretically correct profile or side of the tooth. The term "indexing motion" refers to the movement of the blank, whereby different teeth are brought successively into position for a tool to engage, the blank of the present invention having a continuing indexing motion after the manner of a hobbing machine. The invention contemplates the production of "curved" teeth, and this expression refers to the shape of a tooth longitudinally, or from end to end, and is intended to define or comprehend the form or forms of teeth which are variously known in the art as curved or spiral teeth, the machines of the present invention producing various forms of non-circular geometrically curved teeth such as roulette, trochoid and the like, this being the first machine to produce longitudinally curved teeth on bevel gears by the hobbing principle of a continuously rotating blank in intermeshing relation with a continuously rotating cutter combined with a relative bodily movement between blank and cutter to generate the tooth profiles.

The present machine may be described in its broad aspect as including a rotary tool head on which are mounted a series of tools or cutters arranged in spaced relation to each other, the disposition of the tools being such that when the tool head is continuously rotated in engagement with a continuously rotating blank, the cutters successively engage different portions of the blank, each operating to make a single cut on the side of a tooth until all the teeth are completed. This result may be obtained by arranging the tools so as to engage corresponding sides of every other tooth, or by having the tools arranged in pairs or otherwise arranged so as to simultaneously engage the adjacent sides of adjacent teeth. With the first mentioned arrangement during two revolutions of the blank, a cut is made on one side of each tooth, while with the latter arrangement, during one revolution of the blank, cuts are made on both sides of each tooth, all of which will be fully explained in the following description. The movements just described comprise the "cutting motion" of the tool and the "indexing motion" of the blank. In addition to the indexing movement of the blank carrier, the latter is also controlled in such a manner as to have imparted thereto a rolling movement, or generating movement, with relation to the tool in operation at any particular moment, for the purpose of generating or automatically producing theoretically correct sides on the teeth, and this is accomplished by rolling both the tool head and the blank, the parts being geared together, so that the automatic rolling movement of the tool head support or cradle, is transmitted in proper generating ratio to the gear blank, being added to or substracted from the indexing movement of the blank by differential gearing, according to whether the direction of roll is the same as, or contrary to, the indexing movement of the blank. The tools are moved into full depth cutting relation with the teeth of the blank without any radial displacement of the cutter with reference to the cone center of the blank. This is due to the generating motion being coordinated with continuous rotating movements of both the cutter and blank, and results from a multiple tool cutter being so placed with reference to the blank to be cut that a simple rotation of the cutter in correct cutting position in mesh with the blank causes the tools to trace, without any bodily translation of the cutter, the complete outline of the theoretical crown gear tooth in mesh with the gear to be cut. When cutting beveled gears, the generating motion alone moves the blank and tools relatively so that the tools cut full depth along the longitudinal curve of the teeth from end to end. In this class of work, it is customary to rough out the blanks, without finishing the sides of the teeth, and to subsequently put them through a finishing machine, and the present apparatus may be utilized either in the capacity of finishing a blank, in which the rough cuts have already been produced, or in making a completed operation, that is to say, entirely finishing the teeth of a blank which has not been preliminarily subjected to a roughing out operation.

In the present mechanism 1 designates the base on which is mounted a bed 2, the support for the tool head being arranged on the bed 2 for movement back and forth. To this end, the said bed includes ways 3 which are engaged by tracks 4 carried by the cradle or tool head support 5. 6 is a standard, arranged for horizontal adjustment on the cradle 5, and provided with vertical guideways 7 on which is arranged the housing 8. Journaled in suitable bearings on the housing 8, is a spindle 9 which is adjustable longitudinally of the housing, and carries the tool head 10 fixed thereon. Also fixed on the spindle 9 is the internal gear 11 by means of which the tool head is driven through the following train of gearing. 12 designates the main drive shaft of the machine having fixed thereon a pulley 13 to which power may be applied. The shaft 12 carries at its inner end a pinion 14, engaging a double pinion 15 fixed on the transverse shaft 16. The pinion 15 drives the vertical shaft 17, provided at its lower end with a beveled gear 18 and slidably mounted in bearings provided near its upper end for this purpose. The shaft 17 carries a bevel pinion 19 engaging a corresponding gear 20 on shaft 21, the latter carying at its opposite end a pinion 22. The pinion 22 engages pinion 23 which is fixed on the shaft 24, the last mentioned shaft carrying at its outer end a pinion 25 engaging the internal gear 11. By the means just described, it will be seen that the tool head is continuously driven in one direction, and the means by which the indexing motion is imparted to the blank carrier and the generating motions to the blank carrier and tool head will now be described.

Figure 8:
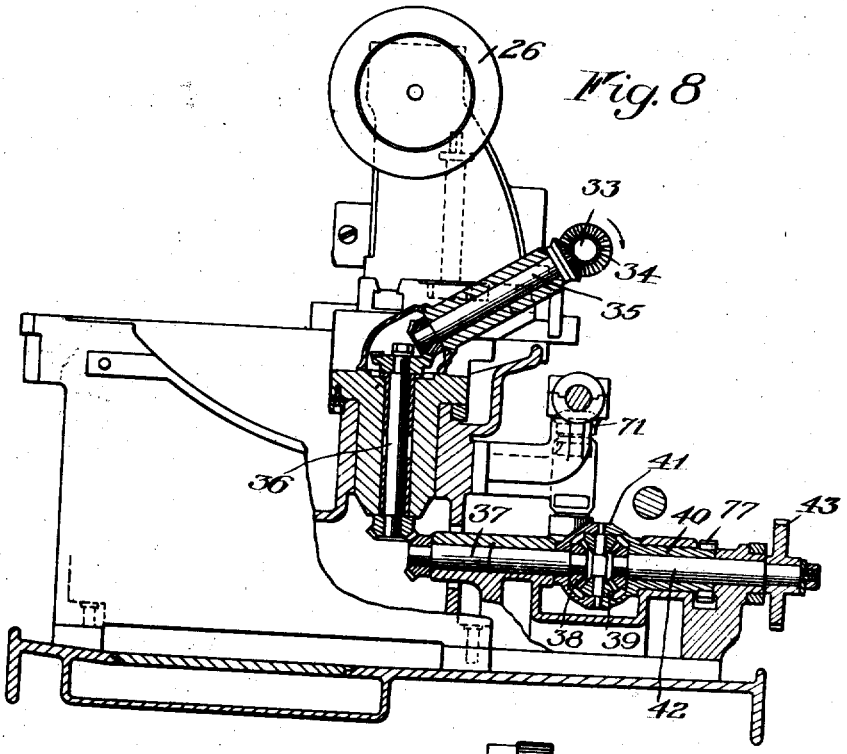
Figure 8 is a vertical sectional view on the line $8^a$—$8^a$ of Fig. 1, partially in elevation.
Figure 9:
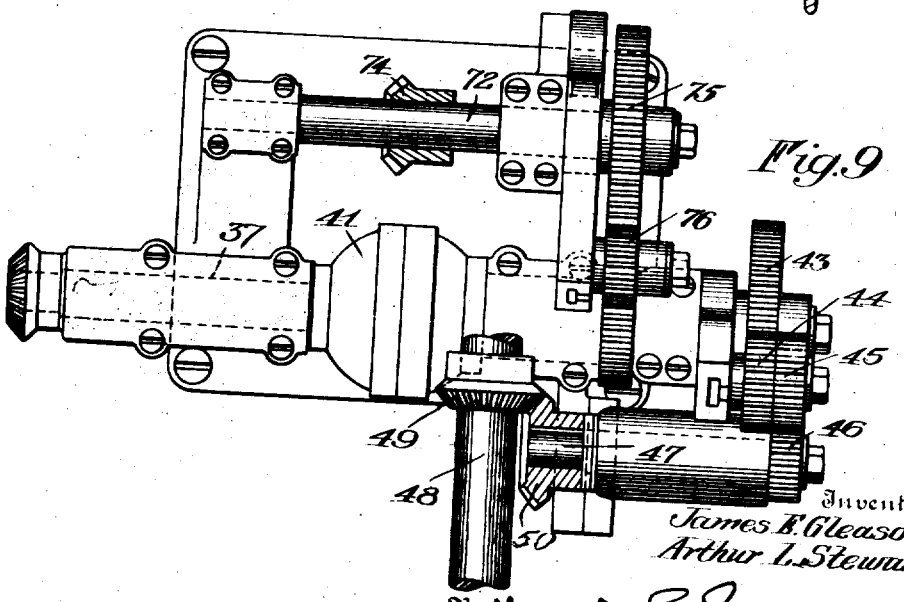
Figure 9 is a plan view of a portion of the gearing which controls the movement of the blank carrier, showing the arrangement whereby the combined indexing and rolling, or generating, movement of the blank carrier is obtained.
Figure 10:
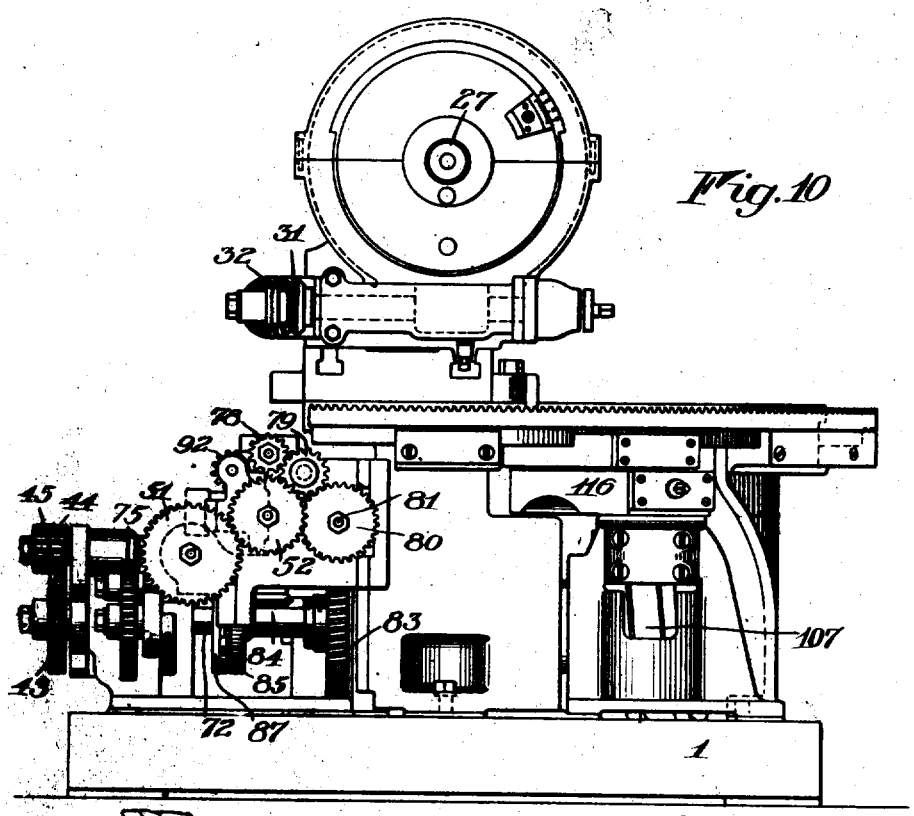
Figure 10 is an end elevation looking toward the left of Figs. 1 and 2.
Figure 11:
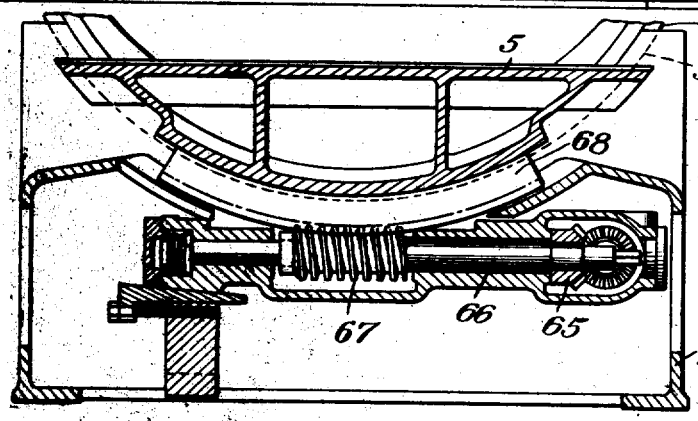
Figure 11 is a vertical sectional view on the line $11^a$—$11^a$ of Fig. 1.
Figure 12:
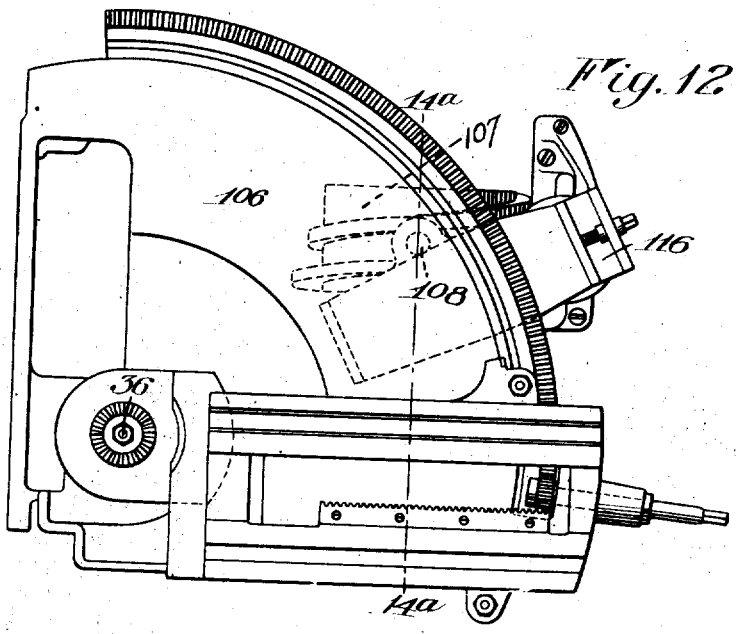
Figure 12 is a plan view of the table on which the blank carrier is mounted, parts above the table being removed.
Figure 13:
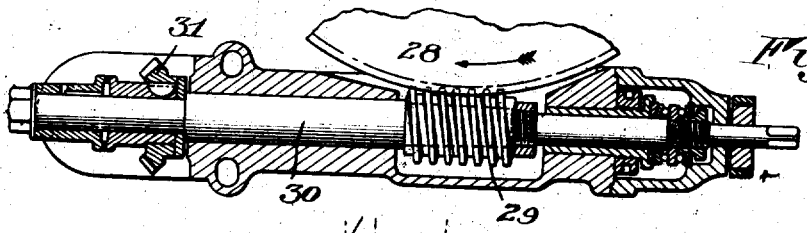
Figure 13 is a sectional view on line $13^a$—$13^a$ of Fig. 1.

The blank, or gear, is designated at 26, and is mounted on a blank carrier 27, the latter being provided with a worm wheel 28 fixed thereon and driven by a worm 29. 30 is a shaft carrying the worm 29 and also a bevel pinion 31 which is driven by the bevel pinion 32 arranged on shaft 33. The latter carries a bevel gear 34 which is driven from the shaft 35, which in turn is operated from shafts 36 and 37 by means of the gearing shown in Fig. 8. The shaft 37 has fixed thereon a bevel pinion 38 meshing with pinions 39, carried by the sleeve 40 of a differential gearing 41. 42 is a shaft carrying the gear 43 which is driven by a gear 44 mounted on a stub shaft which also carries a gear 45. The latter meshes with a gear 46 on the shaft 47 which is driven from shaft 48 through bevel gears 49 and 50. The shaft 48 carries at its outer end a gear 51 which meshes with a gear 52, mounted on the reversible shaft 54, which is controlled by a reversing mechanism that will be described hereinafter. The shaft 54 is driven from the shaft 55, carrying a gear 56, operated through the idler gear 57 by the gear 58 mounted on the main shaft 59. The shaft 59 is provided at one end with a gear 60 which is engaged by a gear 61 on stub shaft 62. The latter carries a bevel pinion 63 engaged by a corresponding pinion on the drive shaft 12.

The oscillatory or rolling movement of the tool head support or cradle is effected from the shaft 48, which is alternately driven in opposite directions through the reversing mechanism already mentioned, and to this end shaft 48 carries a bevel gear 64, which drives a corresponding pinion 65 on a shaft 66. During this rolling or generating motion of the tool head support, the tool spindle or axis is moved bodily in such a manner as to sweep out a portion of a surface of revolution.

The shaft 66 is mounted in suitable bearings beneath the cradle and is provided with a worm 67 having engagement with a segmental worm gear 68 secured to the cradle. With this arrangement it will be seen that a generating movement is imparted to the blank carrier through the differential 41 in accordance with the movements of the cradle which carries the tool head, and the means for imparting the indexing motion to the blank will now be set forth.

For indexing, the blank is driven continuously in one direction, and to this end the shaft 55 carries a pinion 69 which drives the shaft 70 through pinion 71. The shaft 70 in turn drives the spindle 72 by means of pinions 73 and 74, and mounted on the spindle 72 is a gear 75 meshing with an idler 76 which latter engages the gear wheel 77 fixed on the sleeve 40 of the differential gearing. The drive mechanism is so arranged that when the tool head is rolling in the same direction that the blank travels, an increased movement is given to the blank through the differential mechanism, and when the tool head is rolling in the opposite direction, or reverse to the indexing movement of the blank, such indexing movement is retarded, and thus the blank, rotating about its own axis, is given a movement which is the resultant or combination of the indexing and generating motions, and is so proportioned with relation to the rolling movement of the tool head that the respective tools are severally brought into correct cutting relation with different portions of the blank which results in both generating the sides or profiles of the teeth and at the same time cutting to full depth of the teeth across the entire face width of the gear being cut.

After the tool head has rolled to the limit of its movement in one direction it is necessary to reverse its direction of movement, and the present machine is designed with the idea of cutting the blank during the rolling movement of the tool head in both directions, although it may be desirable to withdraw the blank from cutting relation with the tool head during the reverse movement of the cradle. In order to effect such change of direction of movement, the shaft 55 carries at one end a pinion 78 which engages the idler 79, the latter meshing with gear wheel 80 on worm shaft 81. 82 is a worm fixed on the worm shaft 81 and engaging the worm gear 83 which is keyed to the spindle 84. 85 is a disk fixed on the spindle 84 and provided with a cam slot 86 which governs the movement of a lever 87, the latter being pivoted at 88 and movable first in one direction and then in the other by engagement with the cam slot 86, and resulting in the alternate reversal of the shaft 48 in the manner which will now be described.

Loosely mounted on shaft 54 is a pair of gears 89 and 90, the gear 89 being driven directly from pinion 91 on shaft 55, while gear 90 is driven through idler gear 92 from pinion 93 on shaft 55. The gears 89 and 90 are thus driven in opposite directions and adapted to be alternately locked to the shaft 54. To this end, the latter has fixed thereon a pawl carrier or collar 94 on which are pivotally mounted locking pawls 95 and 96, both fixed on a pin 115, and arranged for engagement with shoulders 97 and 98 on sleeves carried by the gears 89 and 90, and designated at 99 and 100. The locking pawls 95 and 96 are provided with tail pieces or operating portions 101 and 102 which are engaged by a roller 103 carried on the lever 87, when the latter is moved into the path of one or the other of said pawls. The collar 94 also carries a spring actuated locking pin 104, arranged in a suitable housing and operating on the tail piece 101 of pawl 95, so as to retain one or the other of the pawls in locked relation with the collar until the roller 103 is operated to engage the other pawl and thus release the first mentioned one. The sleeves 99 and 100 are preferably provided with the inclined projections 105 which are adapted to engage the pawl and carry them fully into their released position, in case the roller 103 does not move them sufficiently for this purpose.

The blank carrier is adjustably mounted on a table 106, the latter being adapted for swinging movement about the central axis 36, when operating on a blank which has not previously been roughed out, in order to move the blank in so that the points of the tools cut tangentially to the root cone of the blank. The machine may, with equal facility, be used in finishing blanks in which rough cuts have already been made on a roughing machine, and in this case, the table 106 is held in fixed position. In order to effect the necessary swinging movement of the table 106, we employ a mechanism similar to what is shown in Patent No. 1,203,608, issued November 7, 1916, and comprising generally a cam 107 mounted on the spindle 84 and engaging projection 108 on a swinging arm 116 adapted to move the table.

Figure 25:
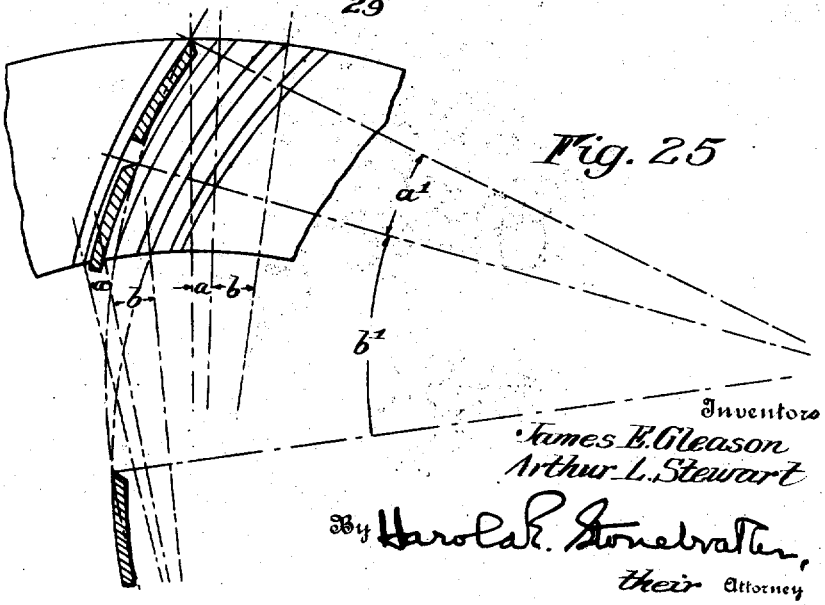
Figure 25 is a diagrammatic showing of the manner in which the cutting tools cooperate with the teeth of a blank, with the arrangement of tools illustrated in Fig. 21.

In Figs. 17 to 19 inclusive, there is shown an arrangement in which alternate tools have their cutting edges extending in opposite directions, so that for each setting of the blank, only every other tool will operate, the remaining tools being inactive. In the arrangement shown in Fig. 17, for instance, the tools marked $x$ will make a cut each time they pass through the blank, while those marked $y$ pass through the blank without cutting. After the teeth are completed on one side, the blank is reset so as to permit the tools $y$ to operate on the opposite sides of the teeth while the tools $x$ are inactive. A reverse arrangement of tools is shown in Fig. 18 for cutting a pinion. In Figs. 21 and 22 the tools are shown arranged in pairs, the tools of each pair passing through a tooth space successively, and operating on the adjacent sides of adjacent teeth. Thus the tools $c$ and $d$ will cut on the sides $c'$ and $d'$, while tools $e$ and $f$, constituting the next pair on the tool head, cut the sides $e'$ and $f'$ of the teeth forming the next tooth space. In the last described arrangement of cutters, the distance between the cutting edges of each pair of tools preferably bears the same ratio to the distance between the last cutting edge of the pair and the initial cutting edge of the next pair of tools, as the width of the base of the tooth space at one edge bears to the distance from the base of one tooth space to the base of the adjacent tooth space. This is shown in Figs. 22 and 25, where $a'$ is in the same ratio to $b'$ as $a$ is to $b$. One form of cutter is shown in Fig. 20, and embodies a body portion 109 provided with the cutting portion 110, the cutting edge of which is indicated at 111. The tool may be attached to the tool head, as illustrated in Figs. 23 and 24, the tool being held in position by means of a bolt 112, and adjustable with relation to the head through a wedge 113, the position of which is determined by an adjusting screw 114 having engagement with the tool head and with the wedge.

We claim as our invention:

1. The method of cutting a gear or wheel which consists in moving a tool in a curved path with its point in a plane tangent to the root surface of the gear to be produced to shape the tooth, imparting a continuous indexing movement to the blank, and simultaneously producing a relative rolling motion between the blank and tool to generate the tooth.

2. The method of cutting a gear or wheel which consists in moving a tool in a curved path with its point in a plane tangent to the root surface of the gear to be produced to shape the tooth, imparting a generating motion to the blank and the tool to generate the tooth, and producing a continuous indexing movement of the blank.

3. The method of cutting a gear or wheel which consists in moving a tool in a curved path with its point in a plane tangent to the root surface of the gear to be produced to shape the tooth, and simultaneously producing a combined rolling and indexing movement of the blank whereby each tooth is generated and the blank is indexed between successive operations of the tool.

4. The method of cutting a gear or wheel which consists in moving a plurality of tools in a curved path with their points in a plane tangent to the root surface of the gear to be produced to shape the teeth, producing a relative rolling motion between the blank and the tools to generate the teeth, and simultaneously imparting a continuous indexing movement to the blank.

5. The method of cutting a gear or wheel which consists in moving a plurality of tools in a curved path with their points in a plane tangent to the root surface of the gear to be produced to shape the teeth, producing a rolling motion of the blank with relation to the tools to generate the teeth, and simultaneously imparting a continuous indexing movement to the blank.

6. The method of cutting a gear or wheel which consists in moving a plurality of tools in a curved path with their points in a plane tangent to the root surface of the gear to be produced to shape the teeth, producing a generating motion of the blank and tools while the latter are cutting, and simultaneously imparting a continuous indexing movement to the blank.

7. The method of forming the side face of a curved gear tooth, which consists in giving to a tool a cutting motion in a circle across the face of a blank, imparting a continuous indexing movement to the blank, and simultaneously producing relative rolling motion between the blank and tool in the manner of a crown gear in mesh with the gear to be cut.

8. The method of cutting a gear or wheel which consists in giving to a tool a cutting motion in a circle with its point in a plane tangent to the root surface of the gear to be produced to shape the tooth, imparting a continuous indexing movement to the blank, and simultaneously rolling the blank to generate the tooth.

9. The method of cutting a gear or wheel which consists in giving to a tool a cutting motion in a circle with its point in a plane tangent to the root surface of the gear to be produced to shape the tooth, producing a relative rolling motion between the blank and the tool to generate the tooth, and imparting a continuous indexing movement to the blank.

10. The method of cutting a gear or wheel which consists in giving to a tool a cutting motion in a circle with its point in a plane tangent to the root surface of the gear to be produced to shape the tooth, and simultaneously imparting to the blank a combined indexing movement and rolling movement with reference to the tool.

11. The method of cutting a gear or wheel which consists in revolving a plurality of tools with their points in a plane tangent to the root surface of the gear to be produced to shape the teeth, producing a relative rolling motion between the blank and the tools to generate the teeth, and simultaneously imparting a continuous indexing movement to the blank.

12. The method of cutting a gear or wheel which consists in revolving a plurality of tools with their points in a plane tangent to the root surface of the gear to be produced to shape the teeth, producing a generating motion of the blank and the tools to generate the teeth, and simultaneously imparting a continuous indexing movement to the blank.

13. The method of cutting a bevel gear which consists in giving a tool a cutting motion in a circle with its point in a plane tangent to the root surface of the gear to be produced to shape the tooth, producing a generating motion of the blank and the tool to generate the tooth, and imparting a continuous indexing movement to the blank.

14. The method of cutting a bevel gear which consists in giving a tool a cutting motion in a circle with its point in a plane tangent to the root surface of the gear to be produced to shape the tooth, and simultaneously imparting to the blank a combined indexing movement and rolling movement with reference to the tool, whereby each tooth is generated and the blank is indexed between successive operations of the tool.

15. In a machine for cutting curved teeth, the combination with a blank carrier, of a plurality of tools movable in a curved path across the face of the blank, means for producing a relative rolling motion between the blank carrier and tools to generate the sides of the teeth, and means for imparting a continuous indexing movement to the blank.

16. In a machine for cutting teeth, the combination with a blank carrier, of a plurality of tools movable in a curved path across the face of the blank, the adjacent tools having their cutting edges arranged to engage relatively opposite portions of the teeth of the blank, means for imparting a relative rolling motion to the blank carrier and tools to generate the sides of the teeth, and means for simultaneously producing a continuous indexing movement of the blank.

17. In a machine for cutting curved teeth, the combination with a blank carrier, of a plurality of tools movable in a curved path across the face of the blank, the cutting edges of adjacent tools being arranged to cut on relatively opposite portions of the teeth of the blank, means for producing a rolling motion of the blank carrier to generate the sides of the teeth, and means for imparting a continuous indexing movement to the blank.

18. In a machine for cutting curved teeth, the combination with a blank carrier, of a plurality of tools movable in a curved path across the face of the blank, the cutting edges of adjacent tools being arranged to cut on relatively opposite portions of the blank, means for producing a generating motion of the blank carrier and tools to generate the sides of the teeth, and means for imparting a continuous indexing movement to the blank carrier.

19. In a machine for cutting curved teeth, the combination with a blank carrier, of a rotary tool head, a plurality of tools on the head having their cutting edges substantially the same distance from the center and their points movable in a curved path in a plane tangent to the root surface of the gear to be produced, and means for producing a continuous indexing movement of the blank coordinated with the rotation of the tool head so as to cause the tools to engage with different teeth on the blank during a single revolution of the head.

20. In a machine for cutting curved teeth, the combination with a blank carrier, of a rotary tool head, a plurality of tools carried on the tool head and movable in a curved path across the face of the blank, the tools having engagement with different teeth on the blank during a single revolution of the tool head, means for producing a relative rolling motion between the blank carrier and tool head to generate the sides of the teeth, and means for imparting a continuous indexing movement to the blank carrier.

21. In a machine for cutting curved teeth, the combination with a blank carrier, of a rotary tool head, a plurality of tools carried on the tool head and movable in a curved path across the face of the blank, means for producing a rolling motion of the blank carrier to generate the sides of the teeth, and means for imparting a continuous indexing movement to the blank carrier.

22. In a machine for cutting curved teeth, the combination with a blank carrier, of a rotary tool head, a plurality of tools carried on the tool head and movable in a curved path across the face of the blank, the tools having engagement with different teeth on the blank during a single revolution of the tool head, means for producing a generating motion of the tool head and blank carrier to generate the sides of the teeth, and means for imparting a continuous indexing movement to the blank carrier.

23. In a machine for cutting curved teeth, the combination with a tool having a cutting motion continuously in a circle, of a blank carrier having a continuous indexing movement, and means for producing a relative rolling motion between the blank carrier and tool.

24. In a machine for cutting curved teeth, the combination with a tool having a cutting motion continuously in a circle, of a blank carrier having a continuous indexing movement, and means for imparting to the blank carrier an additional movement of rolling with relation to the tool to generate the sides of the teeth.

25. In a machine for cutting curved teeth, the combination with a tool having a cutting motion continuously in a circle, of a blank carrier having a continuous indexing movement, means for imparting a rolling movement to the tool, and means for producing an additional rolling movement of the blank carrier with relation to the tool to generate the sides of the teeth.

26. In a machine for cutting curved teeth, the combination with a continuously rotating blank carrier, of a rotary tool head and a series of tools arranged concentrically of the head in spaced relation to each other and extending in a direction perpendicular to the face of the head so as to cut a surface substantially perpendicular to the axis of the tool head, the adjacent tools having their cutting edges oppositely arranged for engagement with different portions of the blank as the latter is rotated.

27. In a machine for cutting curved teeth, the combination with a continuously rotating blank carrier, of a rotary tool head and a series of tools arranged on the tool head in spaced relation to each other, the alternate tools having their cutting edges extending in opposite directions and engaging with different portions of the blank during a revolution of the tool head.

28. In a machine for cutting curved teeth, the combination with a rotary tool head, of a series of tools arranged concentrically of the head in spaced relation to each other and extending in a direction perpendicular to the face of the head so as to cut a surface substantially perpendicular to the axis of the head, the adjacent tools having their cutting edges oppositely disposed.

29. In a machine for cutting curved teeth, the combination with a rotary tool head, of a series of tools arranged on the head in spaced relation to each other and extending in a direction perpendicular to the face of the head so as to cut a surface substantially perpendicular to the axis of the head, the adjacent tools having their cutting edges oppositely disposed.

30. The method of generating spiral bevel gears, comprising the movement of a series of generating tools through the same path with their points in a plane tangent to the root surface of the gear to be produced transversely of the gear blank and through an endless orbit, and simultaneously imparting to said gear blank a combined rolling and rotational movement by which successive tools generate successive teeth.

31. The method of cutting longitudinally curved teeth in a bevel gear blank which consists in rotating a plurality of cutting tools at a uniform radial distance from a common axis, imparting to the blank a continuous rotary indexing movement about its axis, and simultaneously effecting a relative rolling generating movement between the tools and blank in the manner of a crown gear in mesh with the gear cut.

32. The method of cutting longitudinally curved teeth in a bevel gear blank which consists in imparting to the blank a continuous rotary indexing movement about its axis, rotating a plurality of tools of substantially uniform radius to represent an intermeshing gear, and simultaneously effecting a relative rolling generating movement in the manner of a crown gear in mesh with the gear to be cut.

33. The method of cutting longitudinally curved teeth in a bevel gear blank which consists in imparting to the blank a continuous rotary indexing movement about its axis, rotating a cutter having a plurality of cutting tools in continuous intermeshing relation with a plurality of teeth cut in the blank during each rotation of the cutter, and simultaneously effecting a relative movement between the tools and blank in the manner of a crown gear in mesh with the gear to be cut to generate the tooth profiles.

34. A machine for cutting longitudinally curved teeth in a bevel gear blank comprising a carrier for the blank having a continuous rotary indexing movement, a plurality of cutting tools rotatable about a common axis at substantially equal distances therefrom and arranged to cooperate with said carrier for producing longitudinally curved teeth on said blank, and actuating means for effecting a relative rolling movement between said tools and blank in the manner of a crown gear in mesh with the gear to be cut to generate the teeth profiles.

35. A machine for cutting longitudinally curved teeth in a bevel gear blank comprising a carrier for the blank having a continuous rotary indexing movement, a rotary cutter having a plurality of tools arranged to cooperate with the carrier for producing longitudinally curved teeth, actuating means for rotating the tools in intermeshing relation with a plurality of teeth cut in the blank during each rotation of the cutter for cutting all of the teeth at the same time, and means for effecting a simultaneous relative movement between the blank carrier and cutter in the manner of a crown gear in mesh with the gear to be cut to generate the tooth profiles.

36. A machine for cutting longitudinally curved teeth in a bevel gear blank comprising a carrier for the blank having a continuous rotary indexing movement about the blank axis, a rotary cutter having a plurality of tools arranged for cooperation with the carrier for producing longitudinally curved teeth, actuating means for rotating the tools in continuous intermeshing relation with the teeth cut in the blank whereby said tools engage a plurality of blank teeth during each rotation of the cutter, a support for said carrier, a support for said cutter, and means for moving one of said supports during the cutting operation to effect a relative rolling movement of the blank carrier and tools in the manner of a crown gear in mesh with the gear to be cut to generate the tooth profiles.

37. The method of cutting longitudinally curved teeth in a bevel gear blank which consists in imparting to the blank a rotary indexing movement about its axis continuously in the same direction, rotating a cutter with a plurality of cutting tools in intermeshing relation with the blank so as to cut upon all of the teeth during each revolution of the blank, and simultaneously effecting a relative rolling movement between the tools and the blank in the manner of a crown gear in mesh with the gear to be cut to generate the tooth profiles.

38. The method of cutting longitudinally curved teeth in a bevel gear blank which consists in imparting to the blank a rotary indexing movement continuously about its axis in the same direction, rotating a cutter with a plurality of cutting tools in intermeshing relation with the blank, operating upon both sides of a tooth space during a single revolution of the cutter and simultaneously effecting a relative rolling movement between the tools and the blank in the manner of a crown gear in mesh with the gear to be cut to generate the tooth profiles.

39. The method of cutting non-circular longitudinally geometrically curved teeth in a bevel gear blank which consists in imparting to the blank a rotary indexing movement continuously in the same direction about its axis, rotating a cutter with a plurality of cutting tools in intermeshing relation with the blank, and effecting a relative rolling movement between the tools and the blank in the manner of a crown gear in mesh with the gear to be cut to generate the tooth profiles.

40. A machine for cutting in a bevel gear blank teeth curved longitudinally in non-circular geometric curves, comprising a carrier for the blank having a rotary indexing movement continuously in the same direction about its axis, a rotating cutter with a plurality of cutting tools arranged to operate on all the teeth of the blank during a single revolution of the blank and to finish all the teeth of the blank in one generating cycle, and actuating means for effecting a relative rolling movement between the said tools and the blank in the manner of a crown gear in mesh with the gear to be cut to generate the tooth profiles.

41. A machine for cutting longitudinally curved teeth in a bevel gear blank comprising a rotatable cutter carrying a plurality of cutting tools, means for causing the cutter to operate on both sides of a tooth space during a single revolution of the cutter, a blank carrier connected through a train of gearing to the cutter, means for controlling and changing the speed of rotation of both the cutter and the blank, and means for effecting a relative rolling motion between the blank and the cutter in the manner of a crown gear in mesh with the gear to be cut to generate the tooth profiles, such relative rolling motion, in addition to generating the profiles of the teeth, acting also to move the tools so that full depth of tooth is cut at all points on the face width of the gear without any radial displacement of the cutter relatively to the cone apex of the gear.

42. The method of cutting a curved tooth bevel gear which consists in rotating a cutter in intermeshing relation with a blank to produce a lengthwise curved tooth, imparting a continuous indexing motion to the blank, and simultaneously effecting a relative rolling motion between the blank and cutter, such that the axis of the rolling member sweeps out a portion of a surface of revolution.

43. The method of cutting a curved tooth bevel gear which consists in effecting a continuous intermeshing action between a cutter and a blank to produce cutting and continuous indexing, and generating the tooth profiles by effecting a relative rolling motion between the cutter and blank in the manner of a crown gear in mesh with the gear to be cut.

44. The method of cutting longitudinally curved teeth on a bevel gear blank which consists in rotating a cutter with a plurality of tools in intermeshing relation with a rotating blank, and generating the profiles of the teeth on the blank by an additional movement between the cutter and the blank in which the cutter is swung bodily about the axis of the crown gear with which the gear blank is theoretically rolling.

45. The method of cutting longitudinally curved teeth on a bevel gear blank which consists in rotating a cutter carrying a plurality of cutting tools in intermeshing relation with a continuously rotating blank, cutting upon both sides of a plurality of teeth in the blank during each revolution of the cutter, and producing a relative swinging of the cutter and blank axes about a third axis to generate the profiles of the teeth, the axis of the member swung sweeping out a portion of a surface of revolution.

46. The method of cutting, on a bevel gear blank, teeth conforming to non-circular geometric curves, which consists in gearing together a cutter spindle carrying a cutter with a plurality of cutting tools and a blank carrying spindle, so that the blank and cutter rotate continuously in intermeshing relation with each other, cutting on both sides of a tooth space in the blank simultaneously, and giving to the cutter and the blank an additional relative swinging bodily movement about an axis to generate the profiles of the teeth.

47. A machine for cutting longitudinally curved teeth in a bevel gear blank comprising a rotatably mounted cutter spindle, a slide for the cutter spindle adjustable with reference to a line containing the cone centre of the gear to be cut, a rotatably mounted blank spindle, a slide for the blank spindle adjustable about a line at right angles to the first and also containing the cone centre of the gear to be cut, actuating means for rotating both cutter and blank spindles in a geared ratio, and means for producing a relative rolling motion between the blank and the cutter, the cutter being so disposed in relation to the blank that it is brought into full depth cutting relation with all points across the face width of the gear by the generating motion.

48. In a machine for cutting curved tooth bevel gears, the combination with a continuously rotating blank, of a cutter having continuous rotating engagement with the blank, and means for producing a relative rolling motion between the blank and cutter in the manner of a crown gear in mesh with the gear to be cut to generate the tooth profiles.

49. In a machine for cutting curved teeth, the combination with a continuously rotating tool, of a blank carrier having a continuous indexing movement, and means for producing a relative rolling motion between the blank carrier and tool, the cutting edges of the tools being arranged to finish the bottoms and both adjacent sides of all tooth spaces during one generating cycle.

50. The method of cutting a curved tooth bevel gear, which consists in effecting a continuous intermeshing action between a cutter and blank to produce cutting and continuous indexing, and generating the tooth profiles by effecting a relative rolling motion between the cutter and blank in the manner of a crown gear in mesh with the gear to be cut, the cutting edges of the tools being arranged to finish the bottoms and both adjacent sides of all tooth spaces during one generating cycle.

51. The method of cutting a curved tooth bevel gear, which consists in effecting a continuous intermeshing action between a cutter and blank to produce cutting and continuous indexing, and generating the tooth profiles by effecting a relative rolling motion between the cutter and blank in the manner of a crown gear in mesh with the gear to be cut, said relative rolling motion, in addition to generating the profiles of the teeth, acting also to move the tools so that full depth of tooth is cut at all points on the face width of the gear without any radial displacement of the cutter relatively to the cone apex of the gear.

In witness whereof, we have hereunto signed our names.

JAMES E. GLEASON.
ARTHUR L. STEWART.